United States Patent [19]

Bonner et al.

[11] Patent Number: 4,707,939
[45] Date of Patent: Nov. 24, 1987

[54] BUMPER STICKER REPLACEMENT BRACKET

[76] Inventors: Wayman A. Bonner; Billie M. Bonner, both of 8925 NE. Fremont, Portland, Oreg. 97220

[21] Appl. No.: 843,492

[22] Filed: Mar. 24, 1986

[51] Int. Cl.⁴ .............................................. G09F 21/24
[52] U.S. Cl. .................... 40/591; 40/10 A; 40/209; 40/611
[58] Field of Search ............... 40/10 A, 209, 591, 588, 40/611, 201, 202

[56] References Cited

U.S. PATENT DOCUMENTS

| | | | |
|---|---|---|---|
| 1,779,234 | 10/1930 | Harris | 40/209 |
| 2,012,385 | 8/1935 | Gearing | 40/611 |
| 2,802,292 | 8/1957 | Bader | 40/591 |
| 2,816,377 | 12/1957 | Hastings | 40/591 |
| 4,453,328 | 6/1984 | Connolly | 40/591 |

*Primary Examiner*—Gene Mancene
*Assistant Examiner*—Cary E. Stone
*Attorney, Agent, or Firm*—Henderson & Sturm

[57] ABSTRACT

An apparatus for displaying a bumper sticker on a vehicle, including a backing plate for attachment to a vehicle and a frame plate of generally the same shape lying in a plane parallel to the backing plate. The frame plate has a central opening therein. Bottom and side elements connect the backing plate and the frame plate together, leaving an open top. A bumper sticker holding plate is provided and is of such a size that it can have a flexible bumper sticker adhesively attached thereto so that when the bumper sticker holding plate with the bumper sticker attached thereto is inserted into the top of the open top, the bumper sticker will be displayed through the opening in the frame plate. Clips are provided for holding the bumper sticker holding plate in place. When it is desired to place a new bumper sticker onto the bumper sticker holding plate, such plate can first be removed to facilitate removing the old bumper sticker before the new one is attached thereto.

1 Claim, 8 Drawing Figures

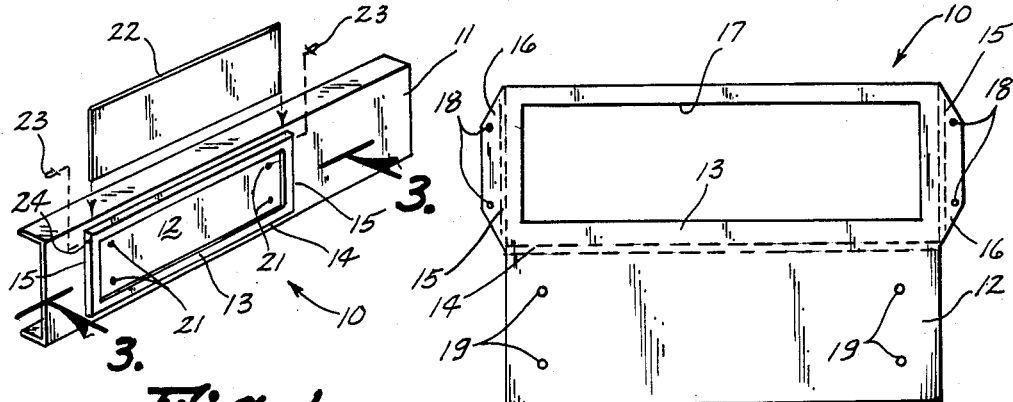
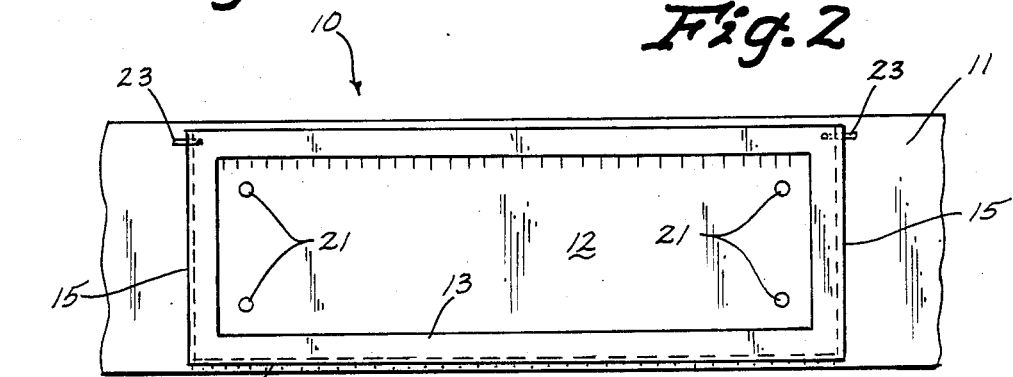
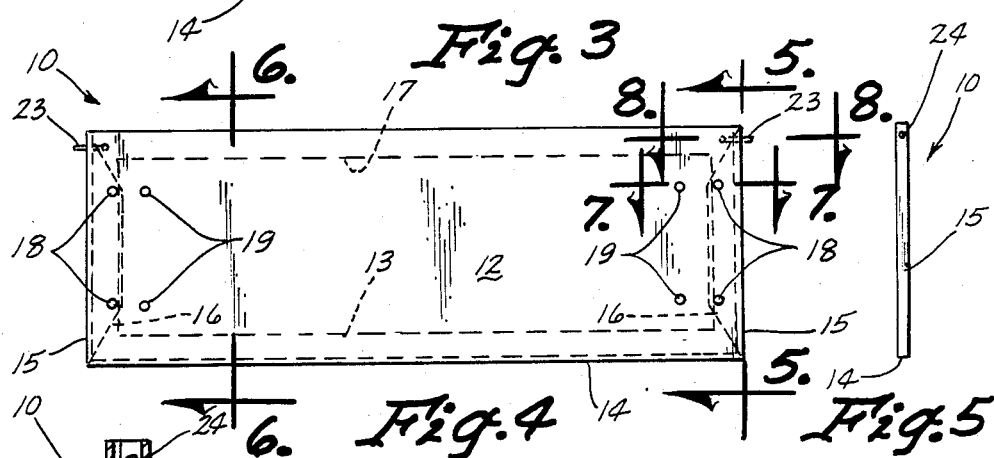
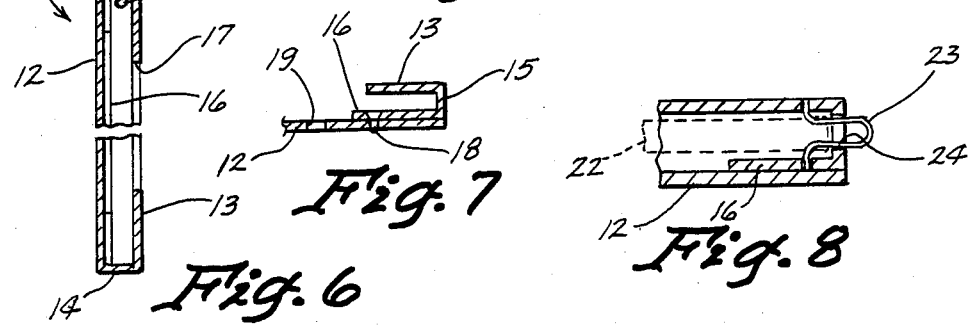

BUMPER STICKER REPLACEMENT BRACKET

TECHNICAL FIELD

The present invention relates generally to an apparatus for the changing of bumper stickers on vehicles and more particularly to a holder for facilitating ease and displaying and changing bumper stickers.

BACKGROUND ART

A popular phenomenon has been the use of bumper stickers for attachment to vehicles and having some message written thereon. These bumper stickers are typically made of paper and have an adhesive backing thereon. One of the problems associated with the use of bumper stickers is that eventually they get old and look faded, worn and generally have a bad appearance. After that occurs, the owner of the vehicle typically would like to remove the bumper sticker, and perhaps even replace it with another one. But once a bumper sticker has been on a vehicle for some time, it is extremely difficult to remove it in one piece and without leaving much of the adhesive on the finish of the vehicle. This problem is exacerbated by the fact that one must typically kneel down and get into an awkward position in order to attempt to remove the adhesive or other parts of the bumper sticker. This is a time consuming job which sometimes needs to be done in cold or inclement weather. When removing the bumper sticker sometimes the finish of the vehicle can be damaged, especially when the bumper sticker has been applied, not to the bumper, but to a portion of the vehicle having paint thereon rather than chrome or plastic.

Consequently, there is a need for an easier way to remove bumper stickers.

DISCLOSURE OF THE INVENTION

The present invention relates generally to an apparatus for displaying a bumper sticker on a vehicle, including a backing plate for attachment to a vehicle and a frame plate of generally the same shape lying in a plane parallel to the backing plate. The frame plate has a central opening therein. Bottom and side elements connect the backing plate and the frame plate together, leaving an open top. A bumper sticker holding plate is provided and is of such a size that it can have a flexible bumper sticker adhesively attached thereto so that when the bumper sticker holding plate with the bumper sticker attached thereto is inserted into the open top, the bumper sticker will be displayed through the opening in the frame plate. Clips are provided for holding the bumper sticker holding plate in place. When it is desired to place a new bumper sticker onto the bumper sticker holding plate, such plate can first be removed to faciliate removing the old bumper sticker before the new one is attached thereto.

An object of the present invention is to provide an improved method of removing bumper stickers from vehicles.

Another object of the present invention is to provide an apparatus for making it easier to remove bumper stickers, or to change them.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of a section of a vehicle bumper having a preferred embodiment of the bumper sticker holding apparatus attached thereto;

FIG. 2 is an elevational view of the main element of the preferred embodiment of the present invention as it is formed in one piece and before it is bent into its final configuration;

FIG. 3 is a view taken along line 3—3 of FIG. 1;

FIG. 4 is a view from the other side of the apparatus than as shown in FIG. 3;

FIG. 5 is a side elevational view taken along line 5—5 of FIG. 4;

FIG. 6 is a cross sectional view taken along line 6—6 of FIG. 4;

FIG. 7 is an enlarged partial cross sectional view taken along line 7—7 of FIG. 4; and FIG. 8 is an enlarged partial cross sectional view taken along line 8—8 of FIG. 4.

BEST MODE FOR CARRYING OUT THE INVENTION

Referring now to the drawings, wherein like reference numerals designate identical or corresponding parts throughout the several views, FIG. 1 shows a preferred embodiment (10) of the present invention shown attached to a bumper (11) of a vehicle (not shown). This bumper could also have a license plate attached thereto at a different point thereon from the part shown in FIG. 1.

Referring to FIG. 2, it is noted that one sheet of material, such as sheeet metal or sheet plastic, has been stamped out in the shape shown in FIG. 2 and including a backing plate (12), a frame plate (13), a bottom plate (14) and side plates (15). Flaps (16) extend from the side flaps (15), it being noted that all of the aforementioned elements (12-16) are formed in one piece from one single sheet of material.

Referring to FIGS. 3-7, it is noted that the backing plate (12) is bent around to be generally parallel to the frame plate (13). The frame plate (13) has an opening (17) in the front thereof. Also, the side plates (15) and the flaps (16) are bent around to the position shown in FIGS. 4, 6 and 7. Threaded fasteners such as machine screws (18) connect the backing plate (12) to the flaps (16).

Openings (19) in the backing plate (12) are provided for receiving screws (21) or the like for attaching to the bumper (11). Alternatively, magnetic mounting strips could be attached to the back of the backing plate (12) or adhesive mounting strips could be utilized instead of the screws (21) going through openings (19).

Referring again to FIG. 1, it is noted that a bumper sticker mounting plate (22) is provided which can be made of the same material as the structure shown in FIG. 2, or it can be of different materials so long as it is at least semi-rigid. It is noted also that while the structure shown in FIG. 2 is preferably formed of sheet metal or plastic, it can, of course, be made of other suitable materials, if so desired.

Clips (23), shown in FIGS. 1 and 8, are provided for extending through openings (24) in the top portions of the side plates (15).

The use of the present invention as shown in embodiment (10) would be that the backing plate (12) is attached to a bumper (11) or alternatively to some other portion of a vehicle. The clips (23) would be removed and the bumper sticker display plate (22) would also be removed from the apparatus (10). A bumper sticker made of paper or other flexible materials with an adhesive backing would then be stuck to the side of the plate (22) which is to be displayed. If desired, a different bumper sticker could be attached to the back of the bumper sticker display plate (22), in case it would be desired to alternatively use one at one time and one at another time. The user would then choose which bumper sticker is to be displayed and the bumper sticker holding member (22) would then be placed into the holder behind the frame (13) so that the bumper sticker could be viewed through the opening (17) therein.

The clips (23), which are made of a spring wire material, would be compressed to go through the openings (24) and then released when they are in the position shown in FIG. 8. With the clips (23) positioned over the top of the bumper sticker holding plate (22), the bumper sticker plate (22) will be securely held in place without fear that it will be pulled out or vibrate out of its casing. The vehicle can then be driven from place to place and the bumper sticker chosen will be appropriately displayed as is the desire of the user.

When it is desired to remove the bumper sticker or change it, the plate (22) can be removed by first removing the clips (23) and then pulling the plate (22) out of its holder in the apparatus (10). The bumper sticker holder (22) can then be taken inside and cleaned off in the kitchen sink or any other convenient place. A new bumper sticker can then be applied to the surface to which the old bumper sticker was removed; then the bumper sticker holding plate (22) can be reinserted into the holding apparatus (10) in the same manner as referred to above, utilizing the final step of inserting the clips (23) through openings (24) (FIG. 8).

Accordingly, it will be appreciated that the preferred embodiment shown does indeed accomplish the aforementioned objects. Obviously, many modifications and variations of the present invention are possible in light of the above teachings. It is therefore to be understood that, within the scope of the appended claims, the invention may be practised otherwise than as specifically described.

I claim:

1. Apparatus for displaying a bumper sticker comprising:
   a vehicle bumper;
   a backing plate, lying in a first place and having a top;
   a frame plate, said frame plate comprising a rectangularly shaped member lying in a plane parallel to
   means for forming an open top around the top of said backing plate, side plates, and frame plate;
   a rectangular bumper sticker holding plate of a size smaller than the outer portion of the frame plate and larger than the rectangular shaped opening therein, said holding plate having a top, a top right corner and a top left corner;
   a flexible bumper sticker adhesively attached to said rectangular bumper sticker holding plate so that it can be viewed through said rectangular opening in the frame plate when said rectangular bumper sticker holding plate is disposed between the backing plate and the frame plate while being supported by the bottom plate;
   an opening disposed in the top portion of each side plate, respectively, above the top of said rectangular bumper sticker holding plate when said rectangular bumper sticker holding plate is resting on the bottom plate;
   a first wire spring clip extending through said opening in the top portion of the right side plate in abutment with the top right corner of the frame plate for selectively holding the top right corner of the bumper sticker holding plate from coming out of the open top;
   a second wire spring clip extending through said opening in the top portion of the left side plate and in abutment with the top left corner of the frame plate for selectively holding the top left corner of the bumper sticker holding plate from coming out of the open top; and
   means for attaching the backing plate to said bumper, said attaching means being located radially inwardly from the inner portion of the frame plate whereby the backing plate can be attached by access through the rectangular shaped opening in the frame plate when said rectangular bumper sticker holding plate is removed.

* * * * *